United States Patent
Moughler et al.

(10) Patent No.: US 9,129,233 B2
(45) Date of Patent: Sep. 8, 2015

(54) SYSTEM AND METHOD FOR TRAINING A MACHINE OPERATOR

(75) Inventors: Eric Alan Moughler, Metamora, IL (US); Jay Ronald Dawson, Peoria, IL (US)

(73) Assignee: Catepillar Inc., Peoria, IL (US)

( * ) Notice: Subject to any disclaimer, the term of this patent is extended or adjusted under 35 U.S.C. 154(b) by 2649 days.

(21) Appl. No.: 11/354,004

(22) Filed: Feb. 15, 2006

(65) Prior Publication Data
US 2007/0192173 A1    Aug. 16, 2007

(51) Int. Cl.
G06Q 10/00    (2012.01)
G06Q 10/06    (2012.01)
G06Q 10/10    (2012.01)

(52) U.S. Cl.
CPC .......... *G06Q 10/06* (2013.01); *G06Q 10/06314* (2013.01); *G06Q 10/06398* (2013.01); *G06Q 10/1097* (2013.01)

(58) Field of Classification Search
USPC ................................................ 705/7.11–7.42
See application file for complete search history.

(56) References Cited

U.S. PATENT DOCUMENTS

| | | | | |
|---|---|---|---|---|
| 3,604,512 A | * | 9/1971 | Carter et al. | 172/4.5 |
| 3,797,124 A | * | 3/1974 | Easterling et al. | 33/331 |
| 4,275,378 A | * | 6/1981 | Henderson | 340/439 |
| 4,798,543 A | * | 1/1989 | Spiece | 434/323 |
| 4,964,077 A | * | 10/1990 | Eisen et al. | 715/707 |
| 5,068,656 A | * | 11/1991 | Sutherland | 340/989 |
| 5,150,609 A | * | 9/1992 | Ebner et al. | 73/114.61 |
| 5,212,692 A | * | 5/1993 | Itoh | 714/704 |
| 5,270,920 A | * | 12/1993 | Pearse et al. | 705/7.16 |
| 5,400,018 A | * | 3/1995 | Scholl et al. | 340/10.3 |
| 5,416,694 A | * | 5/1995 | Parrish et al. | 705/7.14 |
| 5,463,567 A | * | 10/1995 | Boen et al. | 702/187 |
| 5,465,079 A | * | 11/1995 | Bouchard et al. | 340/576 |
| 5,499,182 A | * | 3/1996 | Ousborne | 701/29.6 |
| 5,618,179 A | * | 4/1997 | Copperman et al. | 434/69 |
| 5,758,299 A | * | 5/1998 | Sandborg et al. | 701/33.7 |
| 5,788,504 A | * | 8/1998 | Rice et al. | 434/219 |
| 5,794,164 A | * | 8/1998 | Beckert et al. | 455/3.06 |
| 5,879,165 A | * | 3/1999 | Brunkow et al. | 434/322 |
| 5,980,429 A | * | 11/1999 | Nashner | 482/8 |
| 6,033,226 A | * | 3/2000 | Bullen | 434/219 |
| 6,073,127 A | * | 6/2000 | Lannert et al. | 706/45 |
| 6,108,591 A | * | 8/2000 | Segal et al. | 701/1 |
| 6,116,652 A | * | 9/2000 | Page | 283/45 |
| 6,119,097 A | * | 9/2000 | Ibarra | 705/7.42 |
| 6,125,358 A | * | 9/2000 | Hubbell et al. | 706/11 |

(Continued)

FOREIGN PATENT DOCUMENTS

JP    2002256555    9/2002

*Primary Examiner* — Alan S Miller
(74) *Attorney, Agent, or Firm* — Finnegan, Henderson, Farabow, Garrett & Dunner, LLP

(57) ABSTRACT

An operator training system for a machine is disclosed. The operator training system comprises an interface in communication with a machine and a processor communicatively coupled to the interface. The processor is configured to receive, via the interface, operation data associated with operation of the machine. The processor is further configured to determine an operator performance value for an operator of the machine based on the received operation data. The processor is also configured to compare the operator performance value with a benchmark value. The processor is further configured to provide one or more training tools to the operator if the operator performance value is less than the benchmark value.

28 Claims, 3 Drawing Sheets

(56) References Cited

U.S. PATENT DOCUMENTS

| | | | | |
|---|---|---|---|---|
| 6,144,901 A * | 11/2000 | Nickles et al. | | 701/19 |
| 6,226,572 B1 * | 5/2001 | Tojima et al. | | 701/23 |
| 6,263,266 B1 * | 7/2001 | Hawthorne | | 701/19 |
| 6,292,724 B1 | 9/2001 | Apsell et al. | | |
| 6,332,106 B1 * | 12/2001 | Hawthorne et al. | | 701/19 |
| 6,370,454 B1 * | 4/2002 | Moore | | 701/29.4 |
| 6,539,289 B2 * | 3/2003 | Ogino et al. | | 701/1 |
| 6,542,851 B2 * | 4/2003 | Hasegawa et al. | | 702/182 |
| 6,587,764 B2 * | 7/2003 | Nickles et al. | | 701/19 |
| 6,589,055 B2 * | 7/2003 | Osborne et al. | | 434/219 |
| 6,611,755 B1 * | 8/2003 | Coffee et al. | | 701/482 |
| 6,622,068 B2 * | 9/2003 | Hawthorne | | 701/19 |
| 6,628,777 B1 * | 9/2003 | McIllwaine et al. | | 379/265.01 |
| 6,632,158 B1 * | 10/2003 | Nashner | | 482/8 |
| 6,654,673 B2 * | 11/2003 | Ferguson et al. | | 701/31.5 |
| 6,744,352 B2 * | 6/2004 | Lesesky et al. | | 340/431 |
| 6,748,303 B2 * | 6/2004 | Hawthorne | | 701/19 |
| 6,778,893 B2 * | 8/2004 | Murakami et al. | | 701/50 |
| 6,789,047 B1 * | 9/2004 | Woodson | | 702/182 |
| 6,856,879 B2 * | 2/2005 | Arakawa et al. | | 701/50 |
| 6,925,425 B2 * | 8/2005 | Remboski et al. | | 702/188 |
| 6,928,353 B2 * | 8/2005 | Finley et al. | | 701/50 |
| 7,082,359 B2 * | 7/2006 | Breed | | 701/36 |
| 7,149,653 B2 * | 12/2006 | Bihler et al. | | 702/182 |
| 7,181,413 B2 * | 2/2007 | Hadden et al. | | 705/7.42 |
| 7,222,086 B2 * | 5/2007 | Huffman | | 705/7.13 |
| 7,246,456 B2 * | 7/2007 | Wray | | 37/382 |
| 7,257,513 B2 * | 8/2007 | Lilly | | 702/182 |
| 7,346,542 B2 * | 3/2008 | Suzuki | | 705/7.42 |
| 7,406,399 B2 * | 7/2008 | Furem et al. | | 702/182 |
| 8,140,358 B1 * | 3/2012 | Ling et al. | | 705/4 |
| 8,554,468 B1 * | 10/2013 | Bullock | | 701/408 |
| 8,600,537 B2 * | 12/2013 | Chen | | 700/111 |
| 8,630,768 B2 * | 1/2014 | McClellan et al. | | 701/36 |
| 2002/0077780 A1 * | 6/2002 | Liebl et al. | | 702/183 |
| 2002/0077781 A1 * | 6/2002 | Liebl et al. | | 702/183 |
| 2002/0091473 A1 * | 7/2002 | Gardner et al. | | 701/35 |
| 2002/0116156 A1 * | 8/2002 | Remboski et al. | | 702/188 |
| 2003/0001734 A1 * | 1/2003 | Schofield et al. | | 340/442 |
| 2003/0139958 A1 * | 7/2003 | Thengvall et al. | | 705/8 |
| 2003/0204407 A1 * | 10/2003 | Nabors et al. | | 705/1 |
| 2003/0231199 A1 * | 12/2003 | Beam, III | | 345/709 |
| 2004/0073468 A1 * | 4/2004 | Vyas et al. | | 705/8 |
| 2005/0049831 A1 * | 3/2005 | Lilly | | 702/182 |
| 2005/0085973 A1 * | 4/2005 | Furem et al. | | 701/50 |
| 2005/0154985 A1 * | 7/2005 | Burkhart et al. | | 715/705 |
| 2005/0171660 A1 * | 8/2005 | Woolford et al. | | 701/33 |
| 2005/0190045 A1 * | 9/2005 | Lesesky et al. | | 340/431 |
| 2005/0192732 A1 * | 9/2005 | Narisawa et al. | | 701/50 |
| 2007/0093925 A1 * | 4/2007 | Moughler | | 700/108 |
| 2008/0319602 A1 * | 12/2008 | McClellan et al. | | 701/33 |

* cited by examiner

SYSTEM AND METHOD FOR TRAINING A MACHINE OPERATOR

TECHNICAL FIELD

The present disclosure relates generally to a method for training a machine operator and, more particularly, to a method for training a machine operator based on operation data associated with the machine.

BACKGROUND

Machines such as, for example, wheel loaders, track-type tractors, motor graders, dozers, and other types of machinery are used to perform a variety of tasks associated with an industry such as mining, farming, construction, transportation, or any other such industry. Operators of these machines may be required to receive a significant amount of training prior to operating these machines. In some cases, machine operators must be licensed and certified by a certification board or governing body to operate certain machines to ensure that the operator has received the appropriate training.

Machine operators are generally trained in computer-based simulators and in training exercises prior to performing actual work-related operations. While these methods may provide a basic level of operational exposure, they may not provide an environment that completely prepares the operator for actual "real-world" work experiences associated with a job site. Thus, many inexperienced machine operators may require additional on-the-job training in certain areas associated with machine operation. Additionally, many experienced machine operators may require supplemental training for certain operational skills and/or new techniques associated with one or more machines. Thus, in order to properly train a machine operator while providing exposure to actual job site conditions, a system for accurately evaluating the performance of the machine operator may be required.

One method for evaluating the performance of a vehicle is described in U.S. Patent Application Publication No. 2005/0171660 ("the '660 publication") to Woolford et al. The '660 publication discloses a system for providing tracking and wireless communications for remote diagnosis of a vehicle. The system may include a controller for controlling a vehicle component and a transmitter located on the vehicle for transmitting data indicative of operation of the vehicle system. The system may also include a processor for receiving the transmitted data and comparing the received data to data received from another vehicle to determine the performance of the vehicles or operators of the vehicles. In some cases, the system may produce aggregate data from a first plurality of vehicles and compare this with aggregate data from a second plurality of vehicles to compare the performance of fleets of vehicles or vehicle operators.

Although the system of the '660 publication may be capable of comparing the performance of one or more vehicles or vehicle operators, it may be inadequate in certain cases. For example, the system of the '660 publication may only compare the performance of a vehicle operator with respect to another vehicle operator. Because vehicle operators may each possess a different level of skill, the system of the '660 publication may not provide a consistent benchmark for evaluating a vehicle operator's performance.

In addition, the system of the '660 publication cannot evaluate the performance of a vehicle operator based on real-time operation data or provide training tools during operation of the vehicle. As a result, vehicle operators may not receive appropriate on-the-job training to address performance weaknesses.

The disclosed systems and methods for evaluating a machine operator are directed towards overcoming one or more of the problems set forth above.

SUMMARY OF THE INVENTION

In accordance with one aspect, the present disclosure is directed toward a method for training an operator of a machine. The method may include receiving, in an operator training system, operation data associated with operation of the machine. The method may also include determining an operator performance value for an operator of the machine based on the received operation data. The method may further include comparing the operator performance value with a benchmark value. The method may also include providing one or more training tools to the operator if the operator performance value is less than the benchmark value.

According to another aspect, the present disclosure is directed toward an operator training system comprising an interface in communication with a machine and a processor communicatively coupled to the interface. The processor may be configured to receive, via the interface, operation data associated with operation of the machine. The processor may be further configured to determine an operator performance value for an operator of the machine based on the received operation data. The processor may also be configured to compare the operator performance value with a benchmark value. The processor may be further configured to provide one or more training tools to the operator if the operator performance value is less than the benchmark value.

In accordance with yet another aspect, the present disclosure is directed toward a machine environment comprising a machine and an operator training system, operatively coupled to the machine. The machine may include at least one sensing device for collecting operation data associated with one or more components of the machine. The machine may also include a controller communicatively coupled to the at least one sensing device and configured to control one or more components or subsystems associated with the machine. The operator training system may be configured to receive operation data associated with operation of the machine. The operator training system may also be configured to determine an operator performance value for an operator of the machine based on the received operation data. The operator training system may be further configured to compare the operator performance value with a benchmark value. The operator training system may also be configured to provide one or more training tools to the operator if the operator performance value is less than the benchmark value.

DETAILED DESCRIPTION

Figure 1:
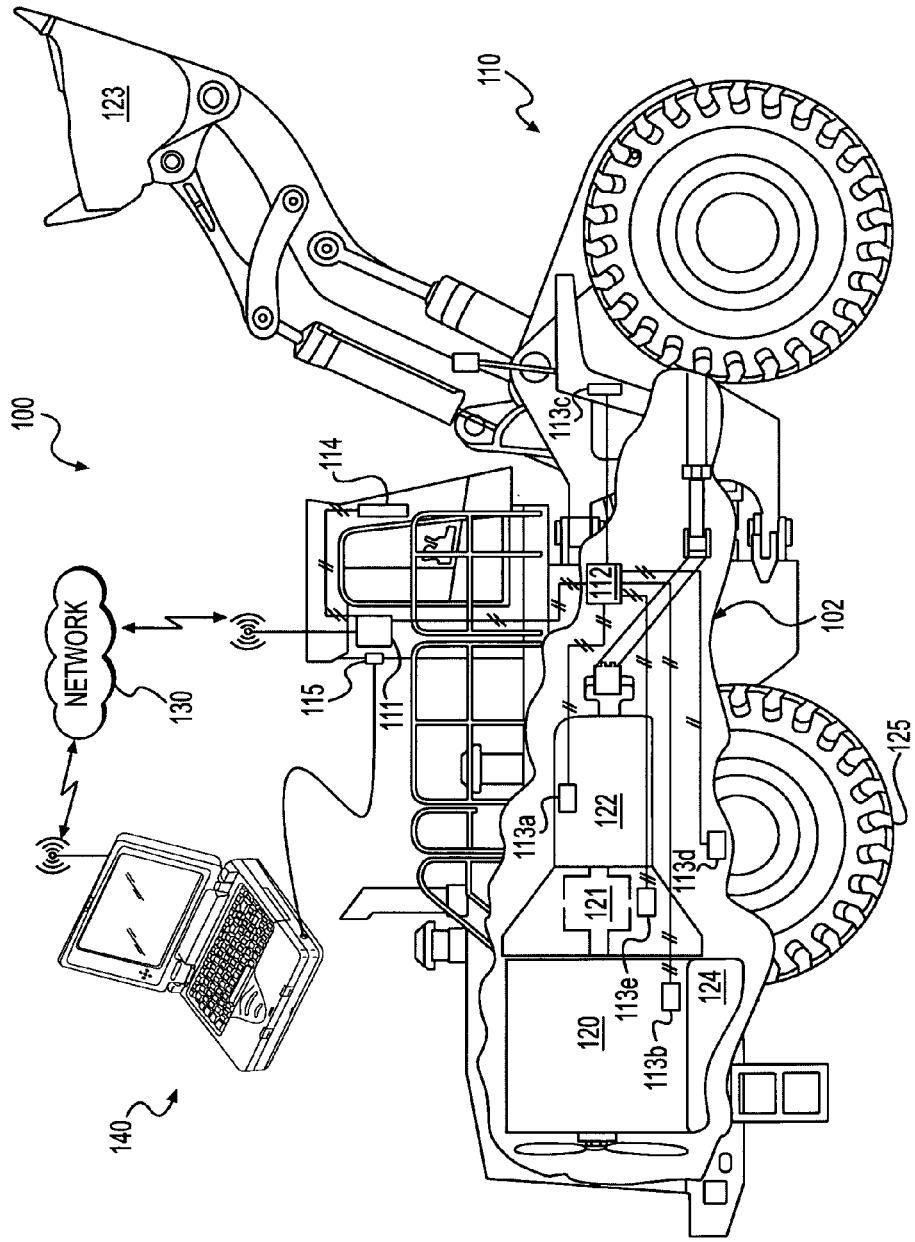
FIG. 1 includes a diagrammatic illustration of an exemplary disclosed machine environment.

FIG. 1 illustrates a machine environment 100 according to an exemplary disclosed embodiment. Machine environment 100 may include any environment in which one or more machines 110 perform a task associated with an industry such as mining, construction, transportation, energy exploration, farming, or any other type of industry. For example, machine environment 100 may include one or more mine sites in which one or more machines 110 cooperate to perform a task associating with the completion of a mining project.

Machine environment 100 may include a machine 110, an operator training system 140, and a communication network 130 for providing data communication between machine 110 and operation training system 140. Although operator training system 140 is illustrated as an off-board system with respect to machine 110, it is contemplated that operator training system may be an on-board system integrated within machine 110. It is further contemplated that machine environment 100 may include additional, fewer, and/or different components than those listed above. For example, machine environment 100 may include additional machines and/or machine types.

Machine 110 may include any fixed or mobile machine for performing a task associated with machine environment 100. For example, machine 110 may include a mobile earth moving machine such as a wheel loader, a track-type tractor, a dozer, a motor grader, an excavator, or any other type of machine. Alternatively and/or additionally, machine 110 may include a stationary machine such as a generator set, a pumping device, a turbine, or any other suitable type of stationary machine.

In one embodiment, machine 110 may include one or more components; or component systems configured to collect and distribute information associated with machine 110 across machine environment 100. For example, machine 110 may include a data collection system 102, a display console 114, a communication module 111, and a direct data link 115 configured to communicate with operator training system 140 via communication network 130. It is contemplated that one or more of data collection system 102, direct data link 115, and communication module 111 may be integrated as a single unit. It is further contemplated that machine 110 may include additional, fewer, and or different components than those listed above.

Communication module 111 may include any device configured to facilitate communication between data collection system 102 and operator training system 140. Communication module 111 may include hardware and/or software that enables communication module 111 to transmit and/or receive data messages through direct data link 115 and/or via communication network 130. Communication module 111 may include, for example, a network interface (not shown), a wireless transceiver (not shown), and a processor (not shown) configured to collect and distribute data associated with machine 110, display data on display console 114, and execute training software associated with machine 110 for use by a machine operator.

Communication network 130 may include any wired and/or wireless communications suitable for data transmission such as, for example, satellite, cellular, point-to-point, point-to-multipoint, multipoint-to-multipoint, Bluetooth, RF, Ethernet, fiber-optic, coaxial, and/or waveguide communications. Alternatively and/or additionally, direct data link 115 may include serial, parallel, USB, Ethernet, fiber-optic, firewire, Bluetooth, or any other type of transmission medium suitable for direct transfer of information.

Data collection system 102 may include one or more components configured to collect information associated with machine 110 during operation of machine 110. For example, data collection system 102 may include one or more sensing devices 113a-e communicatively coupled to a controller 112. Data collection system 102 may correspond to an electronic control module (ECM) associated with machine 110 or, alternatively, may embody a standalone unit dedicated to the collection and distribution of machine data. It is contemplated that data collection system 102 may include additional and/or different components than those listed above.

Display console 114 may be communicatively coupled to communication module 111 and may include any audio, video, and/or combination audio-video device suitable for communicating information associated with machine environment 100 to a machine operator. For example, display console may include one or more LCD, CRT, plasma, or any other type of display monitor and a graphical user interface (GUI), one or more indicator lights, and/or an audio device (e.g., speaker, microphone, headset, etc.) that provides operation data associated with a component or subsystem of machine 110 to a machine operator. Alternatively and/or additionally, display console 114 may relay dispatch information (i.e., maintenance and/or repair information, shift change schedules, etc.), operational instructions and/or recommendations, job site data (weather, soil conditions, temperature, etc.), payload information, productivity data, or any other type of information. It is also contemplated that display console 114 may display software applications and/or operator assistance tools (e.g., training tools, etc.) executed by communication module 111 and/or a controller 112.

Sensing devices 113a-e may include any type of sensor or sensor array and may be associated with one or more components of machine 110 such as, for example, a power source 120, a torque converter 121, a transmission 122, a work implement 123, a fluid supply 124, a traction device 125, and/or other components and subsystems of machine 110. Sensing devices 113a-e may be configured to automatically gather operation data associated with one or more components and/or subsystems of machine 110 such as, for example, implement, engine, and/or machine speed and/or location; fluid pressure, flow rate, temperature, contamination level, and or viscosity of a fluid; electric current and/or voltage levels; fluids (i.e., fuel, oil, etc.) consumption rates; loading levels (i.e., payload value, percent of maximum payload limit, payload history, payload distribution, etc.); transmission output ratio, slip, etc.; grade; traction data; scheduled or performed maintenance and/or repair operations; and any other suitable operation data. It is contemplated that sensing devices may be associated with additional, fewer, and/or different components and/or subsystems associated with machine 110 than those listed above.

Controller 112 may be communicatively coupled to each of sensing devices 113a-e and may include one or more components configured to monitor, record, store, sort, filter, analyze, and/or communicate operation data associated with machine 110 and/or its components and subsystems. These components may include a memory, one or more data storage devices, a central processing unit, a communication interface, or any other components configured to execute an application. For example, controller 112 may correspond to an integrated control module associated with machine 110, such as an electronic control module (ECM) or any other suitable machine control device.

Operator training system 140 may include one or more computer systems configured to collect, monitor, analyze, evaluate, store, record, and transmit operation data associated with machine 110. Operator training system 140 may be associated with one or more business entities associated with machine 110 such as a manufacturer, an owner, a project manager, a dispatcher, a maintenance facility, a performance evaluator, or any other entity that generates, maintains, sends, and/or receives information associated with machine 110. Although operator training system 140 is illustrated as a laptop computer, it is contemplated that operator training system may include any type of computer system such as, for example, a desktop workstation, a handheld device, a personal data assistant, a mainframe, or any other suitable computer system.

Figure 2:
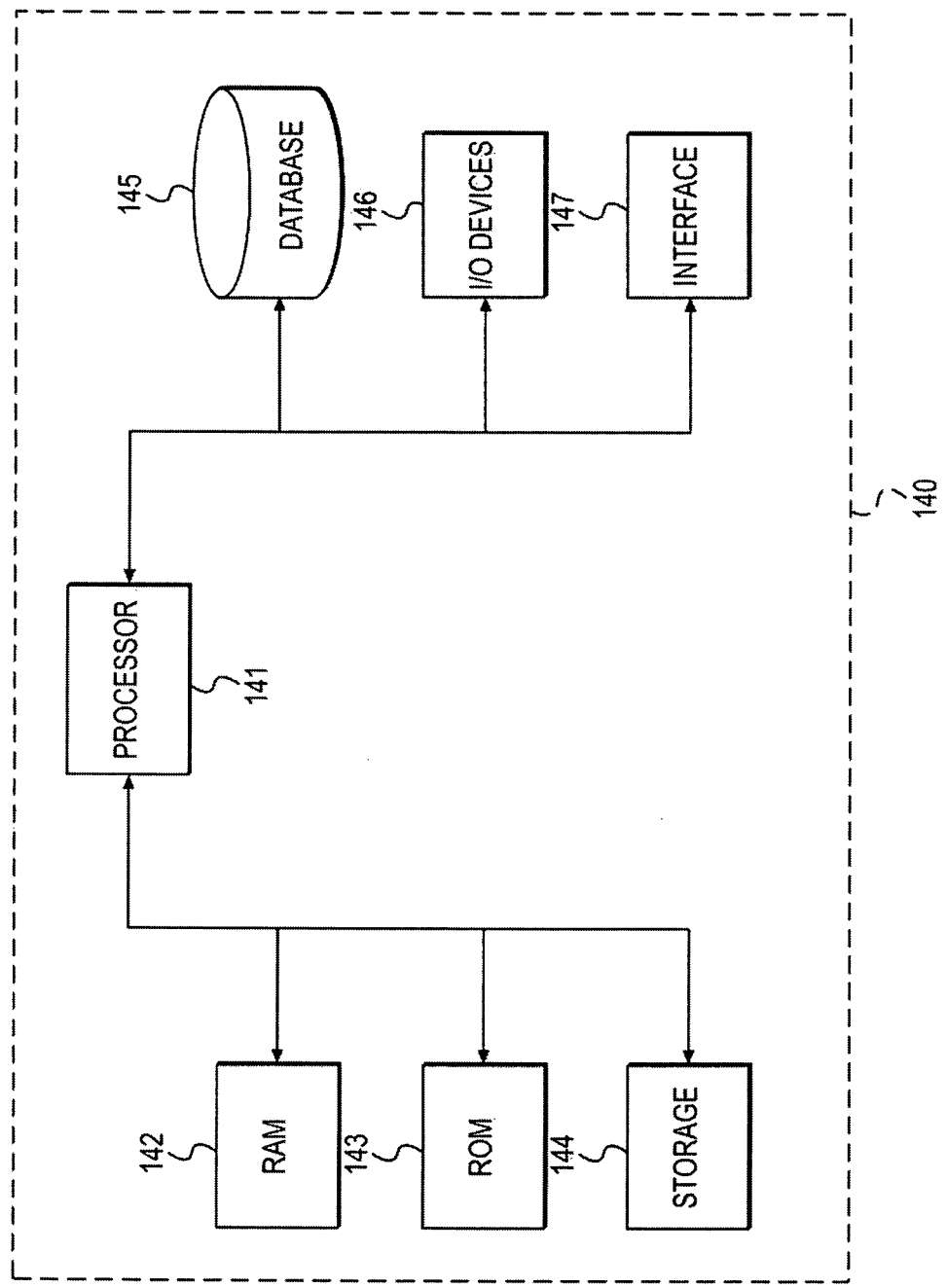
FIG. 2 includes a block diagram illustration of an exemplary disclosed computer system for use with the machine of FIG. 1.

As illustrated in FIG. 2, operator training system 140 may include one or more components for executing software programs. For example, operator training system may include a processor (i.e., CPU) 141, a random access memory (RAM) 142, a read-only memory (ROM) 143, a storage 144, a database 145, one or more input/output (I/O) devices 146, and an interface 147. It is contemplated that operator training system 140 may include additional, fewer, and/or different components than those listed above. It is understood that the type and number of listed devices are exemplary only and not intended to be limiting.

CPU 141 may include one or more processors that can execute instructions and process data to perform one or more functions associated with environmental monitoring system 140. For instance, CPU 141 may execute software that enables operator training system 140 to request and/or receive operation data from machine 110. CPU 141 may also execute software that enables operator training system 140 to determine performance data based on the received operation data associated with one or more machines 120. CPU 141 may also execute software that determines what, if any, training may be required by a machine operator based on the calculated performance data. CPU 141 may also execute software that generates, archives, and/or maintains training schedules, operator performance data, historical operation data, or any other type of information associated with machine 110. CPU 141 may also execute, activate, and/or initiate training tools used by an operator based on the determined performance data.

Storage 144 may include a mass media device operable to store any type of information needed by CPU 141 to perform processes associated with environmental monitoring system 140. Storage 144 may include one or more magnetic or optical disk devices, such as hard drives, CD-ROMs, DVD-ROMs, or any other type of mass media device.

Database 145 may include one or more memory devices that store, organize, sort, filter, and/or arrange data used by operator training system 140 and/or CPU 141. For example, database 145 may store historical performance data associated with a particular operator of machine 110. Database 145 may also store benchmark and/or other data values associated with operator performances. Database 145 may also store operational parameters for each component or system of components associated with machine 100, including normal operating ranges for the components, threshold levels, etc.

Input/Output (I/O) devices 146 may include one or more components configured to interface with a user associated with machine environment 100. For example, input/output devices may include a console with integrated keyboard and mouse to allow a user of operator training system 140 (e.g., customer, client, project manager, etc.) to input one or more benchmark values, modify one or more operational specifications, and/or access operator performance data. Operator training system 140 may store the performance and/or operation data in storage 144 for future analysis and/or modification.

Interface 147 may include one or more elements configured for communicating data between operator training system 140 and one or more data communication modules 111 over communication network, 130 and/or direct data link 115. For example, interface 147 may include one or more modulators, demodulators, multiplexers, demultiplexers, network communication devices, wireless devices, antennas, modems, and any other type of device configured to provide data communication between operator training system 140 and remote systems or components.

Additionally, interface 147 may include hardware and/or software components that allow a user to access information stored in operator training system 140. For example, operator training system 140 may include a data access interface that includes a graphical user interface (GUI) that allows users to access, configure, store, and/or download information to external systems, such as computers, PDAs, diagnostic tools, or any other type of external data device. Moreover, interface 147 may allow a user to access and/or modify information, such as operational parameters, operating ranges, and/or threshold levels associated with one or more component configurations stored in database 145.

Operator training system 140 may be configured to communicate with machine 110 during the operation of machine 110. For example, operator training system 140 may receive operation associated with machine 110 from communication module 111 via communication network 130. Operator training system 140 may receive the operation data either automatically or in response to a request for information provided to communication interface 111. Alternatively and/or additionally, operator training system 140 may transmit information which may include, among other things, commands, recommendations, instructions, job site data, work assignments, environmental conditions (i.e., weather information, soil quality, etc.), and training tools to machine 110 via communication system 130.

Operator training system 140 may also be configured to calculate, rate, and/or otherwise evaluate a performance associated with machine 110 and/or an operator of machine 110. This determined performance may be based on operation data associated with machine 110 such as, for example, productivity data (i.e., amount of material moved, haul rate, percent payload, cycle time, etc.), engine operational characteristics (engine speed, fuel consumption, etc.), terrain quality (i.e., finished grade tolerance, soil pack density, slope tolerance, etc.), or any other type of operation data suitable for determining operator performance.

The performance may be determined by comparing the received operation data with predefined specifications. CPU 141 may determine performance data by comparing operation data to predetermined or expected operation values. For instance, CPU 141 may execute software that compares a current payload with the payload rating for the particular size and type of machine stored in database 145. The operator performance may be calculated as a percentage of the rated payload value associated with the particular machine. Similarly, CPU 141 may execute software that determines how often a machine was operated outside a desired engine speed range over a given time period and calculates a performance value based on the determination. In one embodiment, sensing devices 113a-e may include a laser mounted on work implement 123, such as a grading device or bucket. Operator training system 140 may receive operation data associated with grading tolerances calculated from the laser readings associated with the laser device on work implement 123. CPU 141 may execute software for calculating a performance value based on the finished landscape grade, as compared to certain standards for grading tolerance stored in database 145. It is contemplated that operator training system 140 may calculate a productivity value for each particular operation or task associated with machine 110. Alternatively and/or additionally, operator training system 140 may selectively calculate a performance value for one or more particular tasks individually and/or separately. It is contemplated that operator training system 140 may include a selectable interface to allow a user to select which operations will be evaluated and the manner and time for performing this evaluation.

Operator training system 140 may also be configured to determine what, if any, training may be required by an operator of machine 110 based on a calculated performance value associated with a particular machine operation. This determination may be made by comparing the calculated performance value with a benchmark value. The benchmark value may include any value that provides a threshold for determining whether a certain performance value is within an acceptable range. A performance value less than the benchmark value may indicate that additional training may be required by an operator of machine 110. Alternatively, a performance value greater than the benchmark value may indicate that an operator is performing the respective operation at an acceptable level, in which case no training may be required. It is contemplated that benchmark values may be specified by a user of operator training system 140 such as, for example, a project manager, a job site foreman, an owner, a rental company, or any other user interested in the operation of work machine 110. It is also contemplated that benchmark values may be specified and/or adjusted by an user at any time. For example, benchmark values may be field specified based on certain project parameters prior to the start of a project. Alternatively, benchmark values may be specified prior to the release of a piece of rental equipment to ensure appropriate operation of the equipment during the rental period.

Alternatively and/or additionally, in addition to the benchmark value, one or more additional values may be established, each value corresponding to different actions taken by operator training system 140 based on the determined performance value. For example, a job-site foreman may establish a minimum value (less than a benchmark value) associated with a minimum acceptable performance value associated with a particular operation. Operator training system 140 may determine that a performance value is less than a benchmark value but greater than the minimum value. Accordingly, operator training system 140 may initiate the execution of training software that assists an operator with the performance of the corresponding task associated with the performance value. Similarly, if a performance value is below the minimum value, operator training system may schedule additional off-duty training (e.g., classroom training, proving ground training, simulator training, etc.) associated with that respective task or operation corresponding to the performance value. It is contemplated that additional and/or different values may be established for comparison with the determined performance value, each corresponding to a particular training tool (or other appropriate training operation) implemented by operator training system 140. For purposes of this disclosure, training tools, as used herein, includes any suitable means for assisting an operator of machine 110 in the performance of a particular task. For example, training tools may include, among other things, an off-duty training session, a ride-on training technician, one or more software tools associated with display console 114 for providing instructions, guidelines, visual training aids (such as a slope-assisting mapping tool for shaping earth to a certain grade), a training system initiated shut-down of the machine, or any other type of training tool.

Operator training system 140 may be configured to evaluate the performance associated with machine 110 and/or an operator of machine 110 with respect to other machines and/or machine operators. For example, during a particular shift, operator training system 140 may evaluate a performance of each machine respective of other machines operating during the shift. In one embodiment, operators of machines that consistently perform above certain benchmarks may be rewarded and/or recognized. Alternatively, operators that consistently perform below certain benchmarks may be reprimanded.

Operator training system 140 may also be configured to provide information to a machine operator during operation of machine 110 via display console 114. Operator training system 140 may provide information including, among other things, operating instructions and/or recommendations, performance ratings, work assignments, shift change data, project schedules, productivity information, and training tools. It is contemplated that additional, less, and/or different information may be provided by operator training system 140 via display console 114 than that listed above.

Although certain embodiments illustrate operator training system 140 as being separate from machine 110, it is contemplated that operator training system 140 may be included within and/or integrated with one or more subsystems associated with machine 110. For example, operator training system 140 may include computer-readable instructions that may be stored within, and/or executed by, controller 112 and/or a processor associated with an ECM of machine 110.

Figure 3:
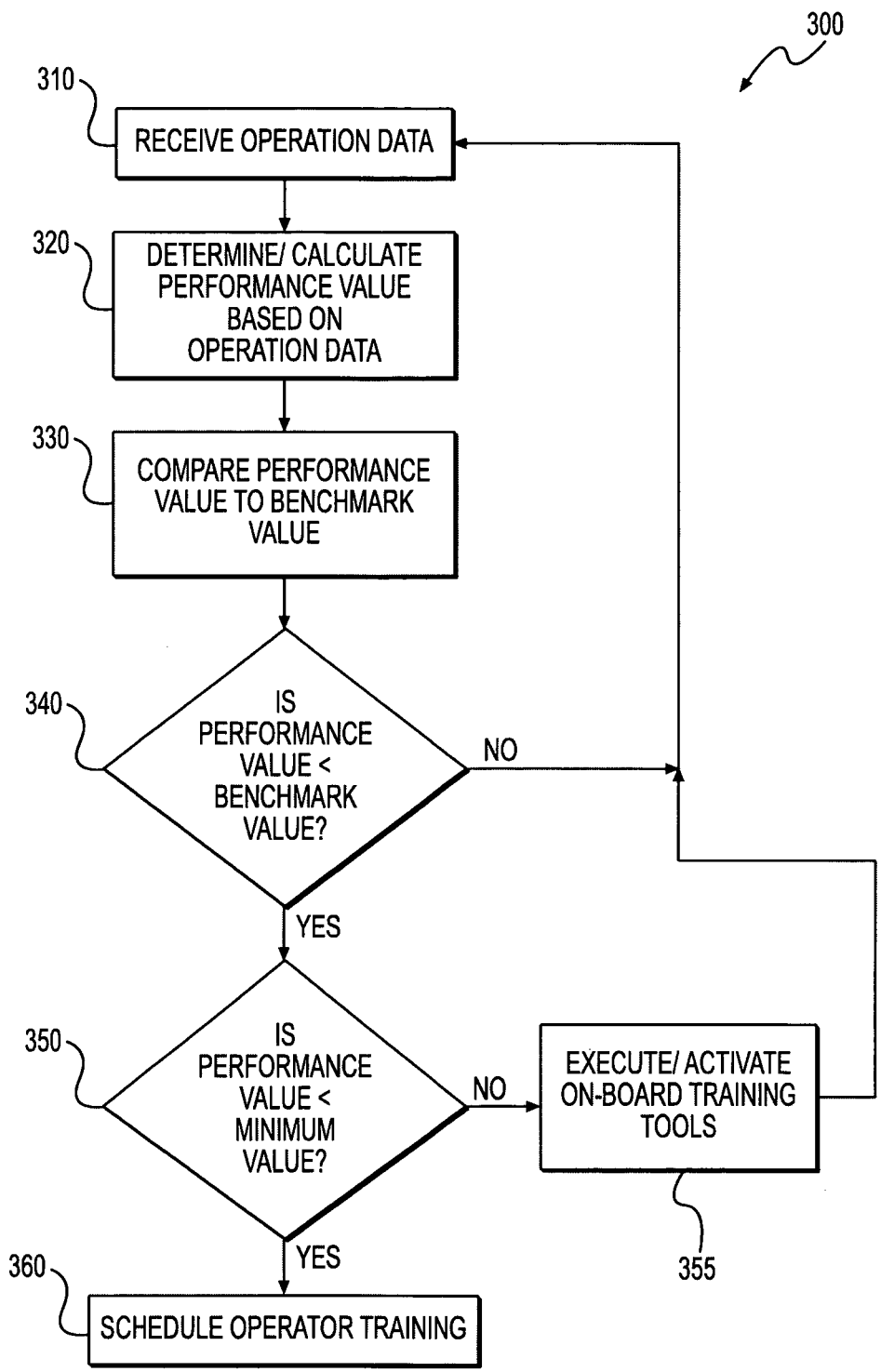
FIG. 3 illustrates a flowchart depicting an exemplary disclosed method for training a machine operator, according to an exemplary disclosed embodiment.

Methods and systems consistent with the disclosed embodiments may provide a training tool that evaluates a performance of an operator of a machine and determine what, if any, training may be required based on the operator's performance. FIG. 3 illustrates a flowchart 300 depicting an exemplary disclosed method for training a machine operator. As illustrated in FIG. 3, operator training system 140 may receive operation data associated with machine 110 (Step 310). This data may be received automatically or in response to a request sent by operator training system 140.

Operator training system 140 may determine and/or calculate an operator performance value associated with a particular operation of machine 110 based on the received operation data (Step 320). For example, CPU 141 associated with operator training system 140 may compare the received operation data with one or more specifications stored in database 145. These specifications may each be associated with one or more components and/or subsystems of machine 110 and may each include predefined data provided by a manufacturer, job-site foreman, project manager, or other qualified entity that defines a normal operation associated with machine 110. These specifications may include, for example, temperature, pressure, engine and/or vehicle speed, etc. associated with normal operation of an engine. For instance, operator training system 140 may be configured to evaluate operation data and calculate an operator performance value indicative of a relationship between the operation data and one or more specifications corresponding to the operation data. For example, operator training system 140 may compare an engine speed associated with an operation of the machine with a nominal engine speed to determine a performance value associated with an engine operating efficiency. Similarly, operator training system 140 may compare a portion of the received operation data associated with payload information with an expected payload specification associated with the machine to determine a performance value associated with payload productivity. In addition, operator training system 140 may compare a portion of the received operation data associated with a deviation of a finished grade of landscape from a design tolerance specifying a maximum acceptable deviation to determine a performance value associated with grading, filling, and sloping tasks. It is contemplated that the performance value may include any value for quantifying a performance associated with the operator.

Upon determining a performance value associated with a particular task of machine 110, operator training system 140 may compare the performance value to a benchmark value associated with the particular task (Step 330). Following the productivity example above, operator training system 140 may compare the performance value associated with productivity of machine 110 to a benchmark productivity value. If the performance value is not less than the benchmark value, operator training system 140 may continue to monitor the performance of the operator (Step 340: No).

If, however, the performance value is less than the benchmark value, operator training system 140 may compare the performance value to a minimum value (Step 340: Yes). Should the performance value not be less than the minimum value (Step 350: No), operator training system 140 may provide a command to communication module 111 to execute and/or activate on-board training tools to assist the machine operator with the corresponding task (Step 355). Operator training system 140 may continue to monitor operator performance. According to one embodiment, should operator performance subsequently increase above the benchmark value, operator training system 140 may deactivate on-board training tools for subsequent operations of machine 110.

Alternatively, should the performance value be less than a minimum value (Step 350: Yes), operator training system may schedule a training session for the operator (Step 360). Following the productivity example above, if the performance value associated with the productivity of the machine is less than a minimum productivity value, operator training system 140 may schedule individual, off-the-job, and/or specialized training for the operator to assist in increasing the productivity of the operator. Alternatively and/or additionally, it is contemplated that in certain situations, operator training system 140 may be configured control certain operations associated with machine 110. For example, operator training system 140 may shut down machine 110 if the performance value is less than a predetermined limit below the minimum value.

Although the exemplary method described above has been described as being performed by operator training system 140, it is contemplated that different and/or additional devices may perform the method. For example, the method may be implemented by one or more software programs as part of a computer system to perform the method.

INDUSTRIAL APPLICABILITY

Although the disclosed embodiments are described in connection with machine environment 100, the disclosed operator training system and associated method may be applicable to any environment where it may be advantageous to evaluate personnel based on real-time data collected from the environment. Specifically, the disclosed operator training system may collect operation data associated with a machine task, automatically evaluate an operator of a machine based on the collected data, and provide training tools to the operator based on the evaluation during the performance of the machine task.

The presently disclosed operator training system 140 may include several advantages. For example, operator training system 140 may include training tools, including software-aided task assistance, that can be activated and deactivated during operation of machine 110. As a result, inexperienced operators may receive assistance during real-time operations of machine 110 if their performance drops below a prescribed benchmark. Not only can this assistance provide operators with valuable "on-the-job" training in a live work environment, it can also maintain a level of productivity during what is typically an unproductive training session.

There may also be cost advantages derived from the ability to provide automated evaluation and training tools within machine environment 100. For example, because operator training system 140 automatically evaluates the performance of one or more machines operating within work environment 100 and determines what, if any, operator training may be required, it may reduce the need for experienced operators to evaluate and train inexperienced drivers. In addition to reducing the number of personnel dedicated to training and development, it may allow more experienced operators to perform more profitable tasks associated with machine environment 100.

Operator training system 140 can also improve efficiency associated with machine environment 100. For example, rather than performing operator evaluation and training periodically (i.e., monthly, quarterly, bi-annually, etc.), operator training system 140 may perform evaluation and training continuously during operation of machine 110, which may lead to increased operator efficiency. In addition, problems associated with operator performance may be detected early, prior to the development of poor habits.

It will be apparent to those skilled in the art that various modifications and variations can be made to the disclosed operator training system and associated method without departing from the scope of the invention. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A computer-implemented method for training an operator of a machine, comprising:
   receiving, in a processor of an operator training system, operation data collected by at least one sensing device on the machine and associated with operation of the machine;
   determining, by the processor, an operator performance value for an operator of the machine based on the received operation data;
   comparing, by the processor, the operator performance value with a benchmark value;
   activating, by the processor, a software tool on a display console of the machine during the machine operation based on the comparison of the operator performance value with the benchmark value, wherein the software tool includes a software program; and
   providing, by the processor, assistance with performance of a task associated with operation of the machine through the software program.

2. The computer-implemented method of claim 1, further including generating a performance summary based on the operator performance value and the benchmark value.

3. The computer-implemented method of claim 1, further including scheduling the operator of the machine for an off-duty training session.

4. The computer-implemented method of claim 1, wherein determining the operator performance value includes:
   comparing at least a portion of the operation data to one or more predetermined specifications; and calculating the operator performance value based on the comparison.

5. The computer-implemented method of claim 4, wherein the operator performance value includes a percent productivity associated with the machine.

6. The computer-implemented method of claim 4, wherein the operator performance value includes a percent efficiency of an engine associated with the machine.

7. The computer-implemented method of claim 4, wherein the operator performance value includes a percent deviation from a finished landscape grade associated with a machine environment.

8. The computer-implemented method of claim 1, further including:
determining whether the performance value is less than a minimum value, wherein the minimum value is less than the benchmark value; and
scheduling an off-duty training session associated with the machine operation only if the performance value is less than the minimum value.

9. The computer-implemented method of claim 1, wherein the assistance is provided during subsequent performance of the task.

10. An operator training system, comprising:
an interface in communication with a machine;
a processor communicatively coupled to the interface and configured to:
receive, via the interface, operation data collected by at least one sensing device on the machine and associated with operation of the machine;
determine an operator performance value for an operator of the machine based on the received operation data;
compare the operator performance value with a benchmark value;
activate an on-board training tool during machine operation based on a determination that the operator performance value is less than a first value but greater than a second value; and
initiate an off-duty training based on a determination that the operator performance value is less than the second value.

11. The system of claim 10, wherein the processor is further configured to generate a performance summary based on the operator performance value and the benchmark value.

12. The system of claim 10 wherein the initiation of the off-duty training includes scheduling the operator of the machine for an off-duty training session.

13. The system of claim 10, wherein determining the operator performance value includes:
comparing at least a portion of the operation data to one or more predetermined specifications; and
calculating the operator performance value based on the comparison.

14. The system of claim 13, wherein the operator performance value includes a percent productivity associated with the machine.

15. The system of claim 13, wherein the operator performance value includes a percent efficiency of an engine associated with the machine.

16. The system of claim 13, wherein the operator performance value includes a percent deviation from a finished landscape grade associated with a machine environment.

17. A machine for training an operator, comprising:
a machine, including:
at least one sensing device for collecting operation data associated with one or more components of the machine; and
a controller communicatively coupled to the at least one sensing device and configured to control one or more components or subsystems associated with the machine; and
an operator training system, operatively coupled to the machine and configured to:
receive operation data associated with operation of the machine;
determine an operator performance value for an operator of the machine based on the received operation data;
compare the operator performance value with a benchmark value;
activate a software tool for display on a display console of the machine during the machine operation only when the operator performance value is less than the benchmark value, wherein the software tool includes a software program, and
provide assistance with performance of a task associated with operation of the machine through the software program.

18. The machine of claim 17, wherein the controller substantially encompasses at least a portion of the operator training system.

19. The machine of claim 17, wherein the operator training system includes a system external to the machine.

20. The machine of claim 17, wherein the controller is further configured to generate a performance summary based on the operator performance value and the benchmark value.

21. The machine of claim 17, wherein the operator training system is further configured to schedule the operator of the machine for an off-duty training session.

22. The machine of claim 17, wherein determining the operator performance value includes:
comparing at least a portion of the operation data to one or more predetermined specifications; and
calculating the operator performance value based on the comparison.

23. The machine of claim 22, wherein the operator performance value includes a percent productivity associated with the machine.

24. The machine of claim 22, wherein the operator performance value includes a percent efficiency of an engine associated with the machine.

25. The machine of claim 22, wherein the operator performance value includes a percent deviation from a finished landscape grade associated with a machine environment.

26. The machine of claim 17, wherein the operator training system is further configured to:
determine whether the performance value is less than a minimum value, wherein the minimum value is less than the benchmark value;
display a software tool on a console of the machine, the software tool configured to aid the machine operator in performing the machine operation if the performance value is less than the benchmark value but not less than the minimum value; and
schedule an off-duty training session associated with the machine operation only when the performance value is less than the minimum value.

27. The machine of claim 17, wherein the software tool is activated only when the operator performance value is less than the benchmark value and greater than a minimum value.

28. The machine of claim 17, wherein the operator training system is configured to provide the assistance during subsequent performance of the task.

* * * * *